(12) United States Patent
Kathail et al.

(10) Patent No.: US 6,728,723 B1
(45) Date of Patent: Apr. 27, 2004

(54) METHOD AND SYSTEM FOR VERIFYING CONFIGURATION TRANSACTIONS MANAGED BY A CENTRALIZED DATABASE

(75) Inventors: Pradeep Kathail, Sunnyvale, CA (US); Carl Sutton, Palo Alto, CA (US); Andrew Valencia, Vashon, WA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/416,312

(22) Filed: Oct. 12, 1999

(51) Int. Cl.⁷ .............................................. G06F 12/00
(52) U.S. Cl. ........................... 707/102; 707/10; 707/3; 707/204
(58) Field of Search .............................. 707/1–10, 102, 707/104

(56) References Cited

U.S. PATENT DOCUMENTS

| | | | | |
|---|---|---|---|---|
| 5,257,368 A | * | 10/1993 | Benson et al. | 707/1 |
| 5,452,459 A | * | 9/1995 | Drury et al. | 707/3 |
| 5,485,455 A | * | 1/1996 | Dobbins et al. | 370/60 |
| 5,509,123 A | * | 4/1996 | Dobbins et al. | 709/243 |
| 5,634,010 A | * | 5/1997 | Ciscon et al. | 707/10 |
| 5,666,645 A | * | 9/1997 | Thomas et al. | 709/217 |
| 5,689,701 A | * | 11/1997 | Ault et al. | 707/10 |
| 5,909,686 A | * | 6/1999 | Muller et al. | 707/104.1 |
| 5,951,649 A | * | 9/1999 | Dobbins et al. | 709/238 |
| 5,963,540 A | * | 10/1999 | Bhaskaran | 370/218 |
| 5,995,628 A | * | 11/1999 | Kitaj et al. | 713/164 |
| 6,014,669 A | * | 1/2000 | Slaughter et al. | 707/10 |
| 6,018,739 A | * | 1/2000 | McCoy et al. | 707/102 |
| 6,021,201 A | * | 2/2000 | Bakhle et al. | 713/189 |
| 6,073,172 A | * | 6/2000 | Frailong et al. | 709/222 |
| 6,078,963 A | | 6/2000 | Civanlar et al. | 709/238 |
| 6,115,715 A | * | 9/2000 | Traversat et al. | 707/100 |
| 6,119,129 A | * | 9/2000 | Traversat et al. | 707/202 |
| 6,161,097 A | * | 12/2000 | Glass et al. | 705/6 |
| 6,226,644 B1 | * | 5/2001 | Ciscon et al. | 707/10 |
| 6,233,582 B1 | * | 5/2001 | Traversat et al. | 707/102 |
| 6,247,096 B1 | * | 6/2001 | Fisher et al. | 707/204 |
| 6,260,120 B1 | * | 7/2001 | Blumenau et al. | 707/3 |
| 6,301,613 B1 | * | 10/2001 | Ahlstrom et al. | 709/223 |
| 6,308,205 B1 | | 10/2001 | Carcerano et al. | 709/221 |
| 6,334,158 B1 | * | 12/2001 | Jennyc et al. | 709/328 |
| 6,446,093 B2 | | 9/2002 | Tabuchi | 707/205 |

* cited by examiner

Primary Examiner—Kim Vu
Assistant Examiner—Anh Ly
(74) Attorney, Agent, or Firm—Sierra Patent Group, Ltd.

(57) ABSTRACT

A method and system for verifying router configuration transactions carried out by a centralized information provider or database system. The centralized database provides verification registration and verification unregistration for various router subsystems associated with said database system. The centralized database and the subsystems registered for verification engage in a verification handler sequence to verify proposed router configuration transactions.

10 Claims, 7 Drawing Sheets

METHOD AND SYSTEM FOR VERIFYING CONFIGURATION TRANSACTIONS MANAGED BY A CENTRALIZED DATABASE

BACKGROUND OF THE INVENTION

1. Field of the Invention

This invention pertains generally to internetwork router operating systems. More particularly, the invention is a method and system for verifying router configuration transactions carried out by a centralized database system.

2. The Prior Art

In a routing device, internetwork operating systems (IOS) or more commonly, router operating systems (OS), provide the basic command functions for the routing device as well as various subsystem components which provide specific functions or routines provided by the routing device.

In general, routing devices carry out the operation of reliably transferring network messages or packets between a network of coupled devices, or a collection of such networks. A reliable transfer protocol is provided by the IOS for carrying out such operation. Additionally, an interface in communication with a Configuration (config) subsystem is provided which allows a user of the routing device to configure the operations of the routing device.

The user may configure, for example, the IP address of a serial interface facility or the default route for the routing device. A config command issued by the user is received by the config subsystem and processed therein. The config subsystem determines from the config command issued by the user which client subsystem is affected by configuration information contained in the config command. The config subsystem then carries out a communication exchange with the affected client subsystem to deliver the change in configuration information.

However, router devices typically include a plurality of client subsystems which manage specific functions, requiring multiple dependencies between the config subsystem and such client subsystems. Furthermore, client subsystems often have multiple dependencies with other client subsystem. For example, the PPP subsystem is dependent upon the IP subsystem for Internet address information and the AAA subsystem for user authentication and credential information. These and other subsystem dependencies as is known in the art prevent modularity in subsystem design and implementation within the IOS of the router.

Another drawback with current subsystem implementation schemes arises when temporary configuration changes to a subsystem are to be carried out. A temporary change is desired when, for example, a user of the routing device wishes to test a particular configuration to analyze the efficiency of such configuration, but would like the opportunity to subsequently revert or "back-out" of the change if desired. During such a configuration sequence, multiple transactions will typically need to be carried out between various subsystems. For example, where a user configures the IP address of a serial facility port, the config subsystem will communicate the new IP address to the IP subsystem. In turn, the IP subsystem will communicate to the PPP subsystem that serial facility port has new IP address information. When the changes are to be aborted or otherwise reverted, a similar chain of communication is necessary to complete the task of reverting prior changes. Such multiple dependencies between the various subsystems of the IOS make common transactions cumbersome and unnecessarily complicated. Furthermore, design and development of the various subsystems of the IOS must take into account these multiple dependencies requiring longer design and development time.

Another situation where a temporary change is desired is when a user connects to the router via a "dial-in" connection port. Dial-in connections are provided by a plurality of subsystem of the IOS. Certain default settings may be configured for most users. However, specialized settings may be configured for certain users, such as network administrators who have particular access privileges, for example. Where a user connects via a dial-in connection, a dialer subsystem communicates with an AAA subsystem to provide name and password information. Responsive to this communication, the AAA subsystem determines the access credentials of the dial-in user from the name and password information and communicates with a PPP subsystem. The access credentials provide, among other things, the configurations for the user at the dial-in connection port. The PPP subsystem then sets the port configurations for the user according to the user's access credentials thereby enabling point-to-point communication for the user.

When the user disconnects, the PPP subsystem, the AAA subsystem and the dialer subsystem need to communicate with each other to restore default settings. This situation presents another illustration where multiple dependencies between the various subsystems of the IOS make common transactions cumbersome and unnecessarily complicated.

Copending application Ser. No. 09/416,310 entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999, describes a method and system for transacting routing device configurations using a centralized information provider or database system and is incorporated herein by reference. In this copending application, a centralized database system (sysDB) is provided within the IOS which manages transactions on router configuration data. The sysDB receives configuration commands from various IOS subsystems. Such commands may include, for example, a request to change configuration data and a request to revert changes made to the configuration data. The IOS subsystems are designed to be modular and independent from each other and are normally dependent only upon the sysDB for carrying out router configuration transactions. However, certain subsystems are "authoritative" for certain router configuration data and are responsible for verifying requested transaction by approving or rejecting changes to the configuration data before such changes are carried out. For example, the IP subsystem is authoritative for IP address changes to the router configuration data and approves or rejects changes to IP address modifications before such changes are made.

Accordingly, there is a need for a method and system for verifying router configuration transactions which uses a centralized information provider for router configuration information and which does not rely upon multiple dependent subsystems. The present invention satisfies these needs, as well as others, and generally overcomes the deficiencies found in the background art.

An object of the invention is to provide a method and system for verifying router configuration transactions which overcomes the prior art.

Another object of the invention is to provide a method and for verifying router configuration transactions using a centralized database.

Another object of the invention is to provide a method and system for verifying router configuration transactions which does not require multiple dependencies between subsystem applications of the router.

Another object of the invention is to provide a method and system for verifying router configuration transactions which allows the subsystem applications of the router to be modular and independent of each other.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method and system for verifying changes to router configuration information maintained by a centralized information provider or database system. The method of the invention is provided by operating system software which is run or otherwise executed on the routing device (router). The method of present invention is implemented by software which is stored on a computer-readable medium, such as computer memory, for example.

In its most general terms, the method of the invention comprises software routines and algorithms which are generally provided as part of an operating system (OS) which is executed in a router device. The operating system software which is also known as internetwork operating system (IOS) comprises a plurality of subsystems, each of which perform functions for the router.

One of the subsystems provided by the IOS is a centralized database system (sysDB). The sysDB executes as a subsystem component in the router and provides a centralized storage and retrieval facility for configuration information required by other subsystems of the IOS. The configuration information stored on the sysDB may include, for example, Internet protocol (IP) addresses, Ethernet configurations, subnet masks, default routes, protocol configuration, name server information, user and password data, access levels, and other router data as is known in the art. As noted above, prior art router implementations have required the individual subsystems to handle storage and retrieval of configuration information related to the corresponding subsystem (i.e., IP subsystems contained IP configuration data, AAA subsystems contained user authentication information). The present invention employs a centralized sysDB which handles storage and retrieval tasks normally assigned to various subsystems. By centralizing such configuration information in a sysDB, multiple dependencies between the other individual subsystem are avoided or greatly reduced. This arrangement allows the subsystem design and implementation to be modular. Subsystems may be added and removed with greater ease due to the lack of multiple and prevalent dependencies.

The sysDB subsystem preferably employs a hierarchical name space scheme in a tree format (sysDB tree) for data storage and retrieval of configuration and other information for the router. Each branch or leaf on the tree is treated as a node or a "tuple". In an illustrative example, the sysDB tree employs a naming convention analogous to the UNIX® file system where intermediate nodes of the tree are analogous to UNIX® directories and where leaf nodes are treated as files and data which are associated with the files. In the preferred embodiment, each node or tuple in the sysDB tree has a pointer to its parent node, a pointer to its next peer, and a pointer to its first child. With this arrangement, all the children of a tuple can be iterated by using the first child as the head of a link list and traversing through the corresponding peer of each child. While the sysDB described above employs a tree structure for data storage and retrieval, other data storage facilities known in the art may be utilized including, for example, a table, btree or relational table scheme without deviating from present invention disclosed herein.

According to a first aspect of the invention, the sysDB carries out the operation of registering subsystem applications for verification of configuration changes made to the router. Subsystem applications may register for verification of configuration data at one or more of the tuples within the sysDB tree maintained by the sysDB. Subsystems may also register for verification of a "name space" or sub-tree of a tuple, wherein the registered subsystem verifies configuration data changes made within all the child nodes of a selected tuple. In the preferred embodiment, only one subsystem is registered for verification at a given tuple for optimum performance. However, the invention is also suitable for use with more than one subsystem registered at the same tuple.

The sysDB also carries out the operation of unregistering subsystem applications for verification. Once a subsystem is unregistered with the sysDB, the unregistered subsystem will no longer carry out router change verifications.

According to a second aspect of the invention, the sysDB and the subsystems registered for verification exchange messages to validate requested transactions to the router configuration information in the form of a verification handler sequence. Transactions which trigger a verification handler sequence may include, for example, a router configuration change, delete, create, or revert.

In operation, when the sysDB receives a transaction request, the sysDB determines whether a subsystem is registered to validate the transaction. In such case, the sysDB transmits a message to the registered subsystem for verification. In response to this message, the registered subsystem replies with one of three values: "accepted and update"; "accepted and do not update"; "rejected". The registered subsystem replies with "accept and update" when the changed value is accepted. In response to an "accepted and update" response, the sysDB updates the sysDB tree with the change value to activate or set the new value provided in the transaction request. The registered subsystem replies with "accepted and do not update" when the changed value is accepted, but is the same as the old value. In response to an "accepted and do not update" reply from a registered subsystem, the sysDB does not update the sysDB tree since the proposed value is already active. The registered subsystem replies with "rejected" when the changed value is rejected. A changed value is rejected using algorithms currently known in the art. The sysDB does not update the sysDB tree in response to a "rejected" reply from the registered subsystem.

The sysDB subsystem is operatively coupled to the other subsystems of the IOS for receiving registration and unregistration requests and for exchanging verification messages, among other things. An illustrative IOS may include an Internet protocol (IP) subsystem, an Ethernet subsystem, a dialer subsystem, a point-to-point (PPP) subsystem, an authentication (AAA) subsystem, and a config subsystem, each subsystem operatively coupled to the sysDB subsystem, but not coupled to each other.

The method and system for carrying out router configuration transactions using the centralized database (sysDB)

are described in detail in copending application Ser. No. 09/416,310 entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999, which is incorporated herein by reference.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
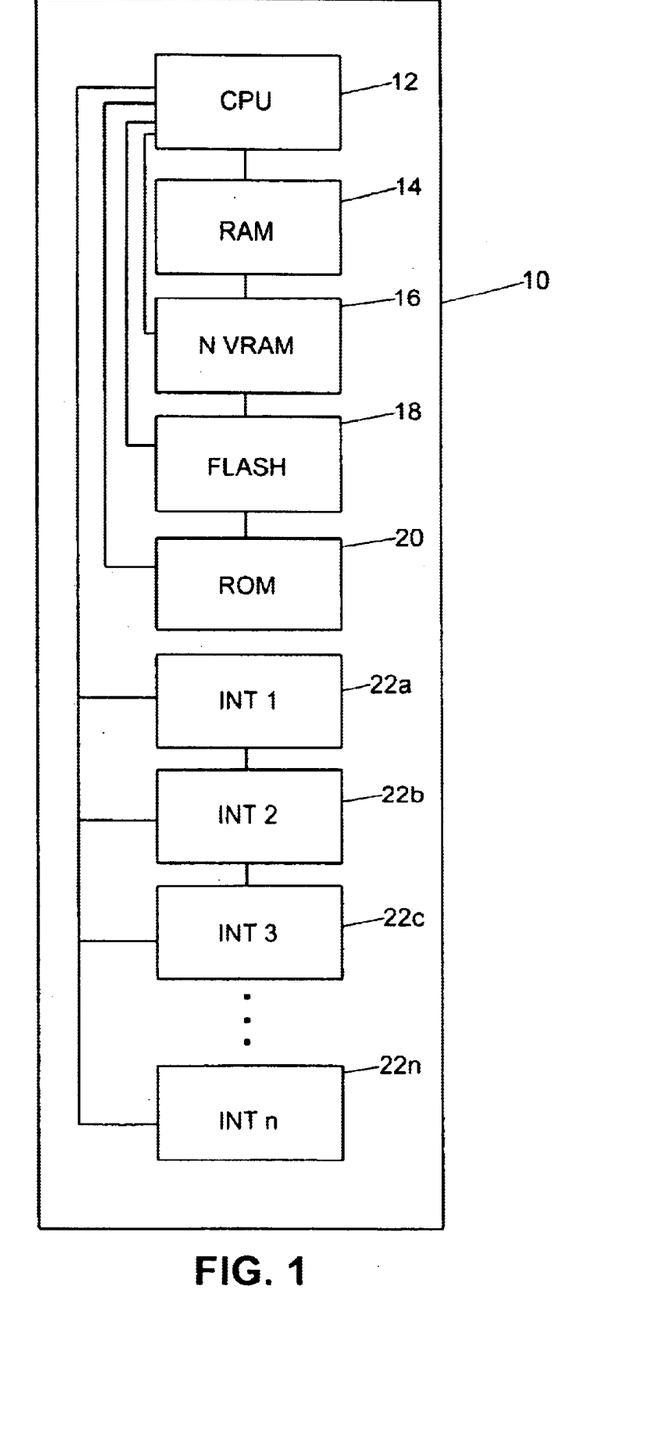
FIG. 1 is a block diagram of a router device suitable for use with the present invention.
Figure 2:
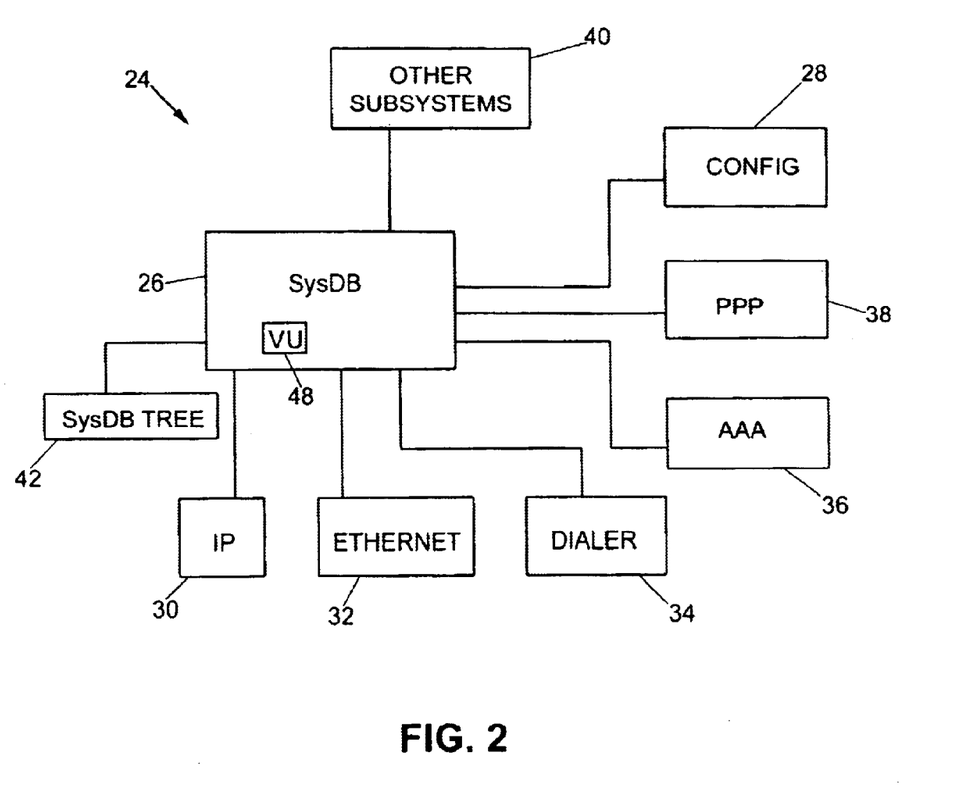
FIG. 2 is a block diagram of an internetwork operating system in accordance with the present invention.
Figure 3:
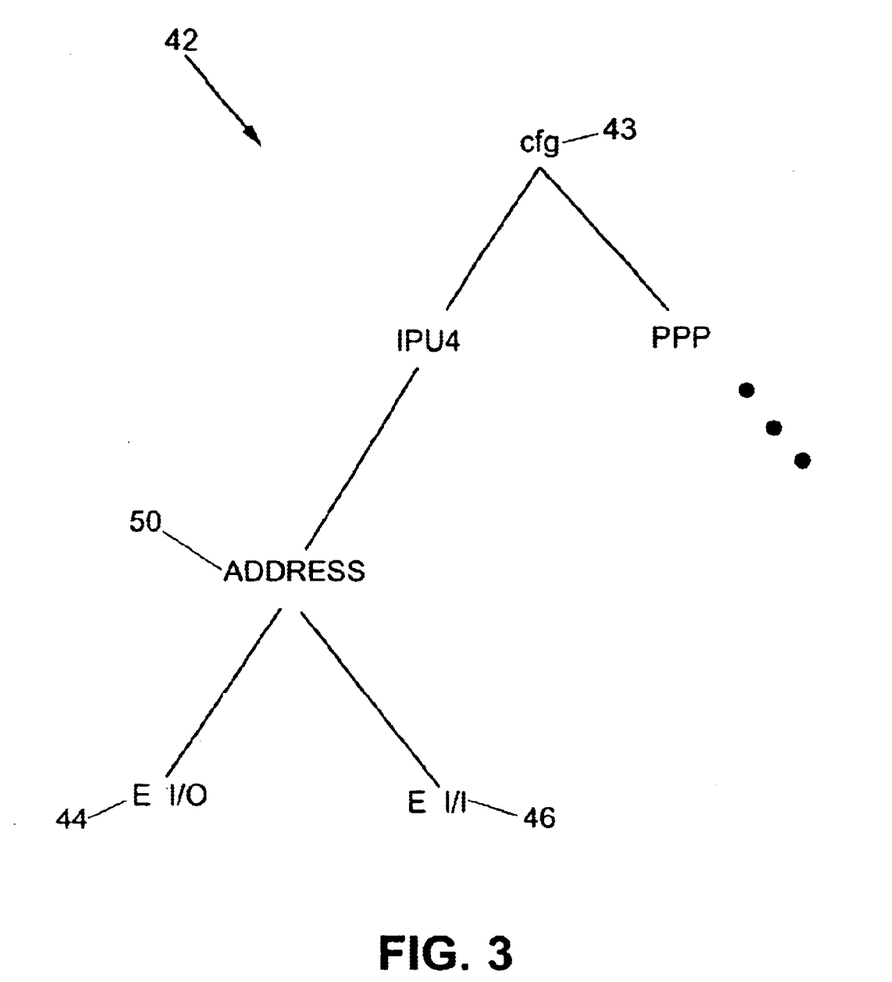
FIG. 3 is a block diagram of an exemplary tree structure for data storage suitable of use with the present invention.

Referring more specifically to the drawings, for illustrative purposes the present invention is embodied in the apparatus shown FIG. 1 through FIG. 3 and the method outlined in FIG. 4 through FIG. 7. It will be appreciated that the apparatus may vary as to configuration and as to details of the parts, and that the method may vary as to details and the order of the steps, without departing from the basic concepts as disclosed herein. The invention is disclosed generally in terms of a method and system for carrying out router configuration transaction verifications, although numerous other uses for the invention will suggest themselves to persons of ordinary skill in the art.

Referring first to FIG. 1, there is shown generally a block diagram of a router device 10 suitable for use with the present invention. The router device 10 includes circuitry or like hardware components well known by those in the art and comprises a CPU 12, random access memory (RAM) 14 operatively coupled to the CPU 12, non-volatile memory (NVRAM) 16 operatively coupled to the CPU 12, flash memory (FLASH) 18 operatively coupled to the CPU 12, read-only memory (ROM) 20 operatively coupled to the CPU 12.

The router device 10 further includes a plurality of interface facilities (INT) 22a through 22n, each of which are operatively coupled to the CPU 12. The interface facilities (INT) 22a through 22n comprise typical ports known in the art which connect to external input/output (I/O) devices. For example, INT 22a may comprise a console port, INT 22b may comprise an Ethernet port, INT 22c may comprise an auxiliary port, and INT 22d may comprise a serial port. Various other port configurations as is known in the art may be arranged without deviating from the present invention.

The CPU 12 carries out the computational tasks associated with executing and running the internetwork operating system (IOS) software of the present invention and comprises circuitry or other hardware as is known in the art. In one exemplary embodiment, the CPU 12 comprises a MIPS R4000 CPU.

The RAM 14 may comprise random access memory or dynamic random access memory. The RAM 14 provides the main storage component for the router The RAM 14 is also referred to as working storage and contains the running configuration information of the router which is managed by the system database (sysDB) as described in further detail below. RAM 14 is volatile memory as is lost when power is interrupted to the router 10.

The NVRAM 16 normally contains a persistent copy of the configuration information of the router. The configuration information includes, among other things, statements about router-specific attributes, protocol functions, and interface addresses. If power is interrupted to the router 10, the persistent copy of the configuration is provided to the router to provide normal routing operation without the need for reprogramming or reconfiguring.

The FLASH 18 is an erasable, programmable read-only memory which contains the internetwork operating system (IOS) software of the router 10. As is known in the art, flash memory has a structure that enables the flash to store multiple copies of the IOS software. Flash memory content is retained when power is interrupted from the router or the router is restarted.

The ROM 20 contains an initializing bootstrap program and is used during initial start up of the router 10. The ROM 20 usually carries out a power-on self-test (POST) to check the hardware components of the router 10 as is known in the art.

During start up, the router 10 conducts the POST check routine which is provided by the ROM 20. The POST check includes a diagnostic which verifies the basic operation of the CPU 12, the RAM 14, the NVRAM 16, the FLASH 18, and interface circuitry 22a through 22n. At the conclusion of the POST, the router 10 loads the IOS software from the FLASH 18 into the RAM 14. It will be appreciated that IOS software may be loaded using a variety of methods without deviating from the present invention including, for example, loading the IOS from an external source such as a TFTP server. The router configuration information is then loaded into RAM 14 from the NVRAM 16. More particularly, the configuration information is loaded into the database server in RAM 14. The configuration information for the router may also be loaded into RAM 14 using other means known in the art. The CPU 12 then proceeds to carry out the tasks required by the IOS.

Referring next to FIG. 2, there is shown a block diagram of an internetwork operating system (IOS) 24 in accordance with the present invention. The IOS 24 which is stored in the FLASH 18 provides the software functions and routines executed by the CPU 12 for the router device 10. The method of the present invention is preferably incorporated into the IOS software device and is executed by the CPU 12. FIG. 3 depicts a block diagram of an exemplary tree structure 42 for data storage which is used in conjunction with the IOS 24 as described herein.

The IOS 24 comprises a plurality of subsystem applications which are executed by the CPU 12 and are loaded and resident in RAM 14. The IOS 24 includes a system database (sysDB) 26 subsystem, a config subsystem 28 coupled to the sysDB 26, an Internet Protocol (IP) subsystem 30 coupled to the sysDB 26, an Ethernet subsystem 32 coupled to the sysDB 26, a dialer subsystem 34 coupled to the sysDB 26, an authentication (AAA) subsystem 36 coupled to the sysDB 26, and a point-to-point protocol (PPP) subsystem 38 coupled to the sysDB 26. It will be appreciated that the configuration shown for IOS 24 is only exemplary and various arrangements of subsystems as known in the art may be used with the method of the present invention. Thus, other subsystems 40 may be coupled to the sysDB 26 to provide additional functions. For example, a SONET subsystem may be coupled to the sysDB 26 to provide optical services.

The sysDB 26 manages a centralized database coupled therewith which is shown and generally designated as sysDB tree 42. The centralized database (sysDB tree 42) may comprise any data storage structure known in the art, and is preferably structured and configured as a tree format (FIG. 3). The sysDB tree 42 contains the running router configuration information used by the various subsystems to carry out their respective tasks.

The sysDB tree structure includes a plurality of branches and leaves which stem from the root configuration (cfg) 43, wherein each branch or leaf is treated as a node or "tuple". For example, FIG. 3 shows a portion of a sysDB tree 42 which includes seven (7) tuples for accommodating router configuration data. For example, Ethernet (E) 1/0 tuple 44 contains Internet address information for Ethernet Port 0 (not shown), and Ethernet (E) 1/1 tuple 46 contains Internet address information for Ethernet Port 1 (not shown). Each tuple includes a first "current" field for storing a current or "default" value associated with configuration information related to the tuple and a second "old" field for storing an "old" configuration value for the tuple. As described further below, the "old" field at a tuple will contain a value when a transaction is currently active on that tuple. When the "old" field value is empty or NULL at a tuple, a transaction is not associated with that tuple. In certain cases, a plurality of values may be stored at a given tuple by providing an array of fields wherein each field of the array may accommodate a certain value. Other data structures for storing data at a tuple may also be implemented at a tuple without deviating from the present invention. For example, a tuple may include a pointer that points to an external data store which contains the value for the tuple.

In the preferred embodiment, each node or tuple in the sysDB tree has a pointer to its parent node, a pointer to its next peer, and a pointer to its first child. Thus, E 1/0 tuple 44 has a pointer to Address tuple 50 and to E 1/1 tuple 46. With this arrangement, all the children of a tuple can be iterated by using the first child as the head of a link list and traversing through the corresponding peer of each child.

The sysDB 26 further includes an iterating function for navigating to a particular tuple within the sysDB tree 42. A tuple iterator is created for traversing the sysDB tree 42 and is destroyed after completion,of its traversal operation. Preferably a tuple iterator does not lock any of the tuples over which it traverses. The sysDB 26 further includes a verification unit (VU) 48 for carrying out verification tasks which are described in more detail in conjunction with FIG. 4 through FIG. 7. The sysDB 26 includes other functions (not shown) related to carrying out transactional and notification tasks.

The config subsystem 28 carries out the operation of receiving configuration commands for a user of the router, executing the configuration command received from the user and providing configuration information to the user of the router upon request from the user. As described above, this router configuration information is stored and managed by the sysDB 26 in the sysDB tree 42.

The IP subsystem 30 carries out the operation of providing wide-area connectivity using a set of protocols associated with Internet Protocol (IP). As is known in the art, the IP subsystem provides packet filtering and forwarding functions for the IP protocol.

A connector device (not shown) may be provided as one of the interface facilities 22a through 22n to connect Ethernet facilities to the router 10. The Ethernet subsystem 32 carries out the operation of providing packet filtering based on Ethernet MAC (Layer 2) or IP (Layer 3) addresses as is known in the art and packet forwarding as is known in the art.

The dialer subsystem 34 carries out the operation of providing dial-in connection services to a user of the router. To this end, the dialer subsystem initiates terminal reception of a user's access credentials, normally in the form of a name and a password.

The AAA subsystem 36 carries out the operation of authenticating the access credentials of users of the router. The AAA subsystem 36 verifies the name and password of the user, which is obtained from the dialer subsystem 34 and determines configuration data for the user as well as access privileges. Configuration data may include such information as the user's IP address, for example. The configuration data for the user is stored in the sysDB tree 42 by sysDB 26 via a transaction request from the AAA subsystem 36.

The PPP subsystem 38 carries out the operation of providing Point-to-Point protocol services over a point-to-point link. As an aspect of providing Point-to-Point protocol services, the PPP subsystem 38 provides a method of encapsulating multi-protocol datagrams into an encapsulated protocol, provides a Link Control Protocol (LCP) which establishes, configures and test the point-to-point link, and provides a Network Control Protocol (NCP) using the encapsulated protocol, which is normally IP.

In operation, the various subsystem applications 28 through 40 may register to verify changes to configuration data maintained in the sysDB tree 42 by the sysDB subsystem 26. During the registration, the subsystem identifies which tuple the subsystem is registering for verification. The system may also identify a name space (i.e., the sub-tree of a tuple) for which the subsystem would like to provide verification.

Once a subsystem application has been registered for verification, the sysDB 26 transmits a message to the registered subsystem for verification when a request to change router configuration data (or other router transaction) for which the subsystem is registered is received by the sysDB 26. In the preferred embodiment, the registered subsystem replies to this message with one of three responses comprising "accepted and update"; "accepted and do not update"; and "rejected".

The registered subsystem replies with "accept and update" when the changed value is accepted. In response to an "accepted and update" response, the sysDB 26 updates the sysDB tree 42 with the changed value. The registered subsystem replies with "accepted and do not update" when the changed value is accepted, but is the same as the old value. In response to an "accepted and do not update" reply from a registered subsystem, the sysDB 26 does not update the sysDB tree 42. The registered subsystem replies with "rejected" when the changed value is rejected. Various algorithms as is known in the art may be used for rejected a changed value including for example, improper format, improper data type and/or invalid value. The sysDB 26 does not update the sysDB tree 42 in response to a "rejected" reply from the registered subsystem.

A subsystem may also unregister with the sysDB 26. When the sysDB 26 receives an unregister request from a subsystem, the sysDB 26 removes the verification registration for that subsystem. Once a subsystem is unregistered, the sysDB 26 will no longer carry out transaction verifications with the unregistered subsystem.

Figure 4:
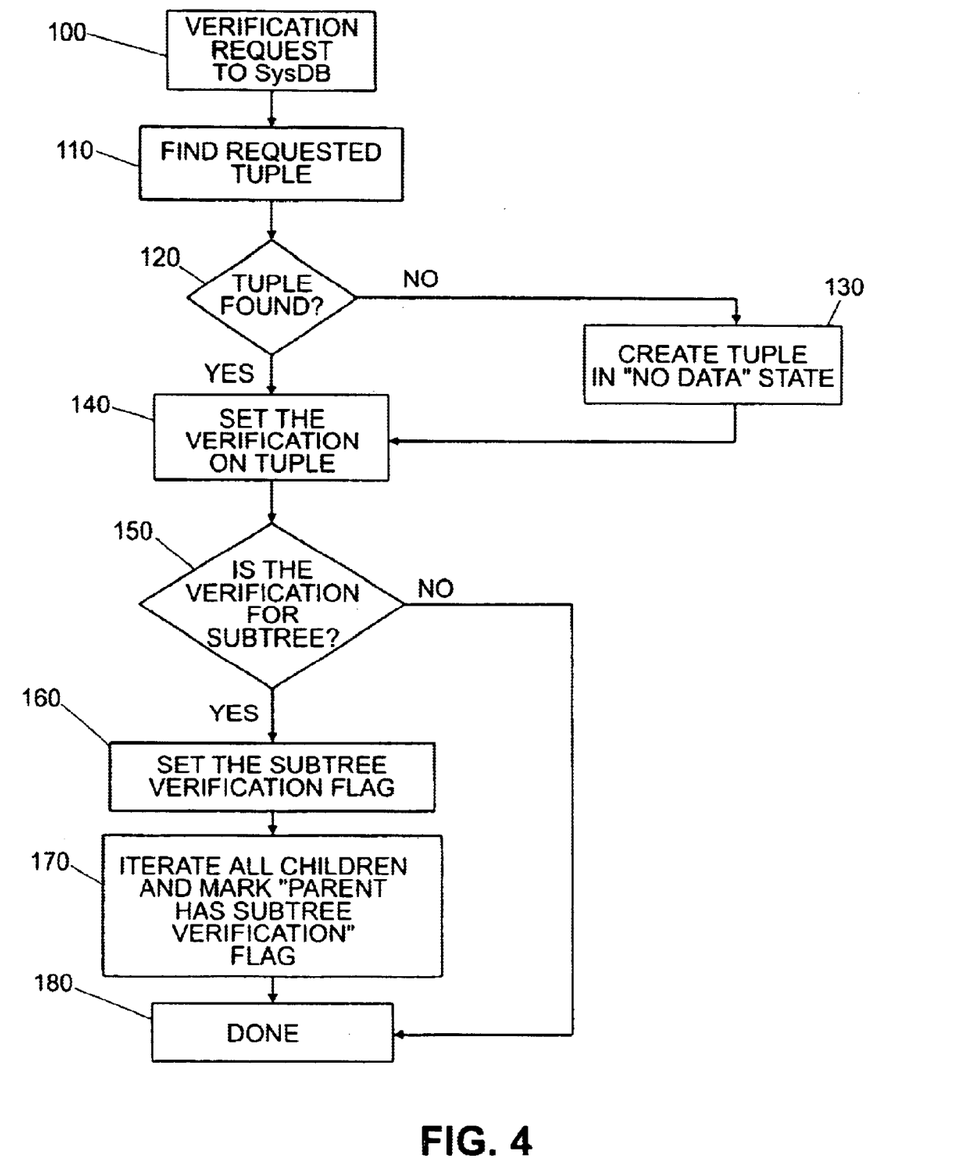
FIG. 4 is a flow chart showing generally the steps involved in registering a subsystem application for verification.
Figure 5:
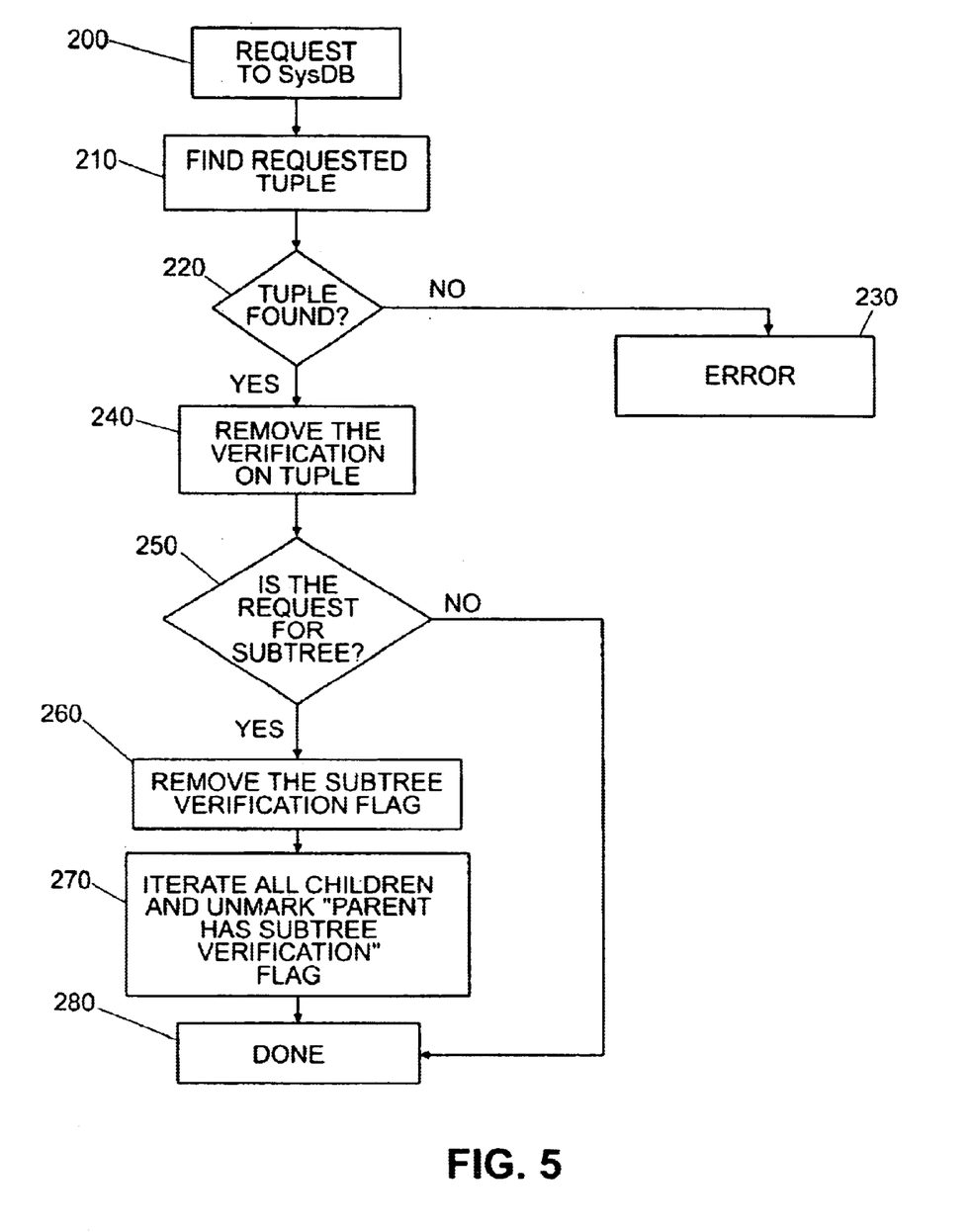
FIG. 5 is a flow chart showing generally the steps involved in unregistering a subsystem application from verification.
Figure 6:
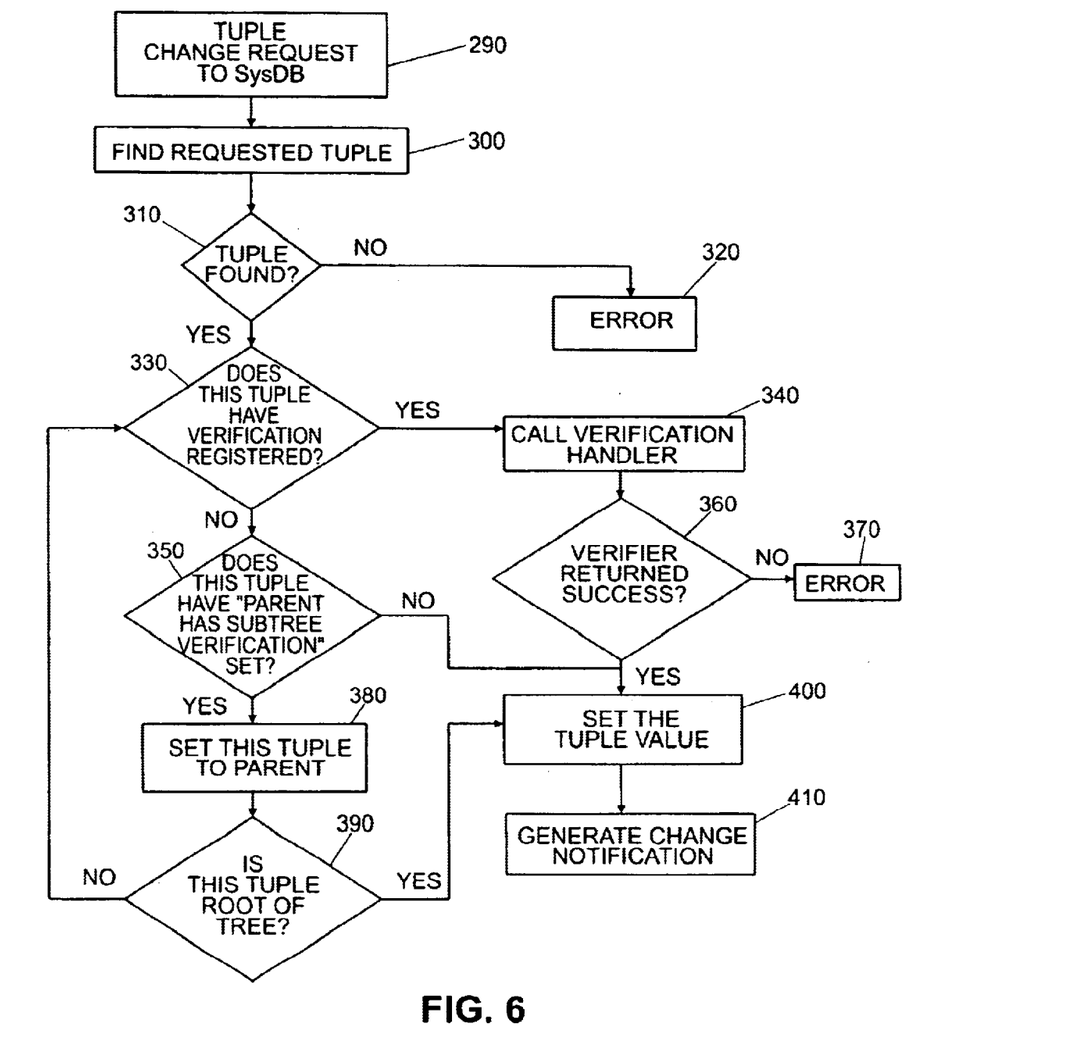
FIG. 6 is a flow chart showing generally the steps involved in verifying a router configuration transaction request.
Figure 7:
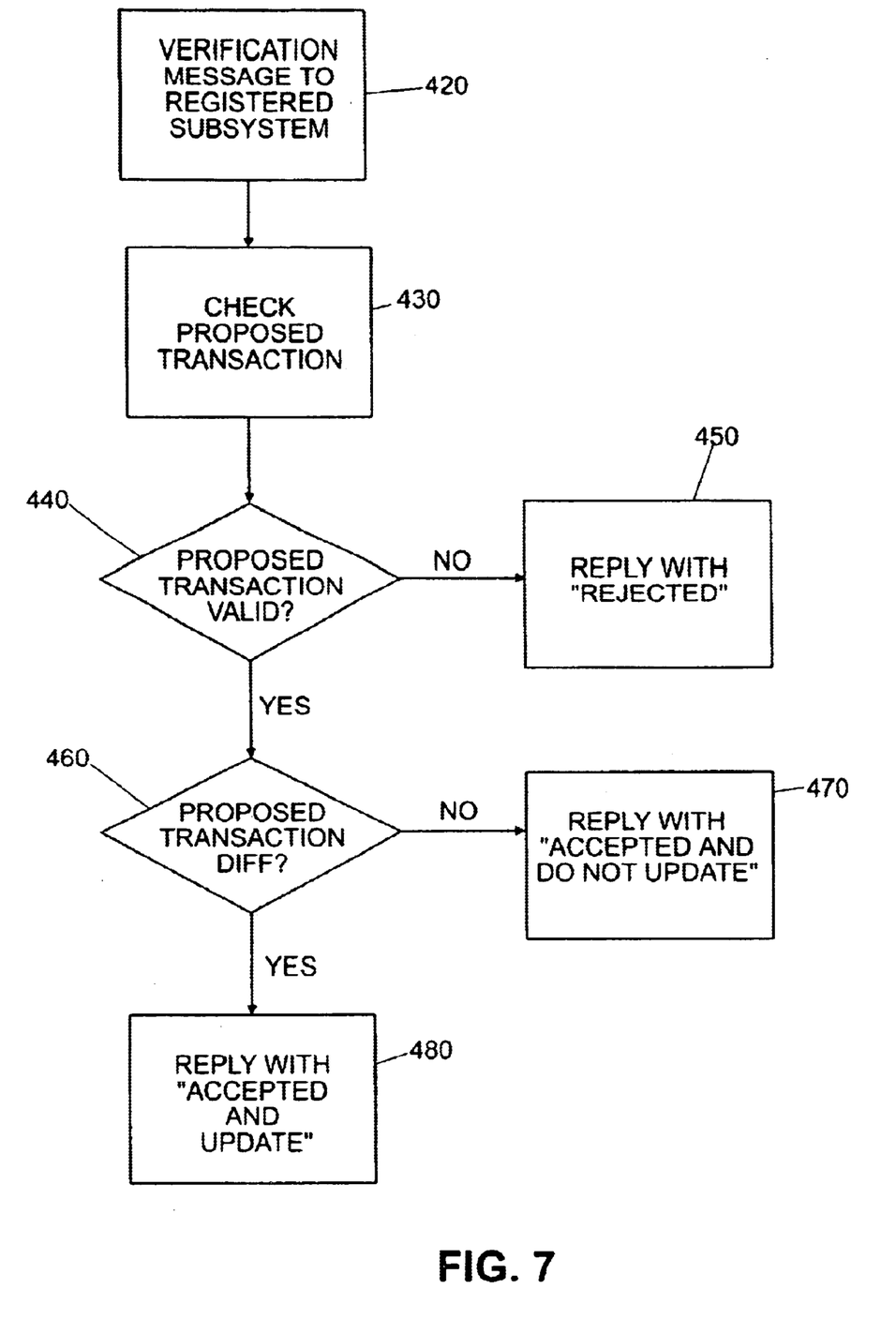
FIG. 7 is flow chart showing generally the steps involved in a verification handler routine.

The method and operation of invention will be more fully understood with reference to the flow charts of FIG. 4 through FIG. 7, as well as FIG. 1 through FIG. 3. FIG. 4 is a flow chart showing generally the steps involved in registering a subsystem application for verification. FIG. 5 is a flow chart showing generally the steps involved in unregistering a subsystem application from verification. FIG. 6 is a flow chart showing generally the steps involved in verifying a router configuration transaction request. FIG. 7 is flow chart showing generally the steps involved in a verification handler routine. The order of steps as shown in FIG. 4 through FIG. 7 and described below are only exemplary, and should not be considered limiting.

Referring now to FIG. 4, as well as FIG. 1 through FIG. 3, there is shown generally the steps of registering a subsystem for verification.

At step 100, a subsystem issues a registration request to the sysDB 26 for verification. This request will indicate, among other things, the configuration data (tuple) for which the subsystem is registering a verification and whether the subsystem is registering for verification of a "name space" which includes the sub-tree data associated with the tuple. Step 110 is then carried out.

At step 110, the sysDB 26 receives the registration request of step 100. In response to this request, the sysDB 26 calls a tuple iterator function to find the location of the tuple for which verification is requested. The iterator function searches the sysDB tree 42 starting at the root (cfg) 43 to ascertain the location of the requested tuple. Step 120 is then carried out.

At step 120, the iterator function determines whether the requested tuple was found during the search of step 110. If the tuple is not found, step 130 is carried out. Otherwise, step 140 is carried out.

At step 130, the iterator function was not able to find the requested tuple in the sysDB tree 42. The absence of a tuple indicates that data for that tuple currently is not available. However, since some of the configuration data maintained in the sysDB 26 is generated dynamically during the operation of the router, the tuple may contain configuration data at some later time during the operation of the router. At this step, a tuple associated with the present verification request is created in the sysDB tree 42. The value for this newly created tuple is set to a "no data" state. Creation of the tuple is necessary during this step to accommodate the registration of verification, although the configuration value for the tuple may be defined at some later time. Step 140 is then carried out.

At step 140, the sysDB 26 registers the verification for the requested tuple. The sysDB 26 indicates at the requested tuple which subsystem will carry out verification in the event of a configuration data transaction request associated with the tuple. In the preferred embodiment, only one subsystem is registered for verification at any given tuple of the sysDB tree 42, although the invention is suitable for use with more than one subsystem registered at a given tuple. Step 150 is then carried out.

At step 150, the sysDB 26 determines whether the request of step 100 was a registration request for a name space (sub-tree) of a tuple. Where a subsystem registers for verification of a name space, the registered subsystem verifies configuration transactions made at the requested tuple as well as configuration transactions made at the children nodes of the requested tuple. If the registration request was for a name space of the requested tuple, step 160 is carried out. Otherwise, step 180 is carried out.

At step 160, the subsystem has registered for verification of a name space. Responsive to this request, the sysDB 26 sets the sub-tree verification flag for the requested tuple. This flag indicates that when a router configuration transaction is requested at any of the child tuples of the requested tuple, that the registered subsystem carries out verification of such requests made at the child tuples. Step 170 is then carried out.

At step 170, the sysDB 26 iterates through each child tuple of the requested tuple to set its "parent has sub-tree verification" flag. This flag indicates that when a transaction request is made at the child tuple level, verification of such request at a parent tuple is to be carried out by a registered subsystem. This flag will also be set for child tuples created at a later time which are child tuples of the requested tuple.

At step 180, the registration is completed. The sysDB 26 will transmit an acknowledgment to the requesting subsystem to indicate that its registration for verification was successful.

Referring next to FIG. 5, as well as FIG. 1 through FIG. 3, there is shown generally the steps of unregistering a subsystem from verification. Once a subsystem is unregistered with the sysDB 26, the subsystem no longer carries out transaction verifications for the tuple for which unregistration is requested.

At step 200, a subsystem issues a verification unregistration request to the sysDB 26. This request indicates the router configuration data for which unregistration is requested. The subsystem may unregister with one tuple or name space and maintain verification registration with other tuples or name spaces.

At step 210, the sysDB 26 receives the unregistration request of step 200. In response to this request, the sysDB 26 calls a tuple iterator function to find the location of the tuple for which unregistration is requested. The iterator function searches the sysDB tree 42 starting at the root (cfg) 43 to ascertain the location of the requested tuple. Step 220 is then carried out.

At step 220, the iterator function determines whether the requested tuple was found during the search of step 210. If the tuple is not found, step 230 is carried out. Otherwise, step 240 is carried out.

At step 230, the iterator function was not able to find the requested tuple in the sysDB tree 42. The absence of a tuple for unregistration is interpreted as an error because unregistration is proper only when a prior registration was made which would have involved the creation of the requested tuple. Since the iterator function did not find the requested tuple, the unregistration request is improper and an error message is displayed to the user to indicate an unregistration error.

At step 240, the sysDB 26 removes the verification registration for the requested tuple. Once verification registration is removed or otherwise deleted, the requesting subsystem of step 200 will not receive future transaction verification messages for the requested tuple. Future transactions will be carried out without further verification until another verification registration is provided at the requested tuple. Step 250 is then carried out.

At step 250, the sysDB 26 determines whether the request of step 200 was an unregistration request for a name space (sub-tree) of the requested tuple. As noted above, where a subsystem registers for verification of a name space, the registered subsystem verifies configuration transactions made at the requested tuple as well as configuration transactions made at the children nodes of the requested tuple. Similarly, if unregistration is requested for a name space, verification made at children nodes of the requested tuple must also be removed. If the unregistration request was for a name space of the requested tuple, step 260 is carried out. Otherwise, step 280 is carried out.

At step 260, the sysDB 26 removes the sub-tree verification flag for the requested tuple. Removal of this flag indicates that the requested tuple no longer verifies configuration transactions made at any of its child tuples. Step 270 is then carried out.

At step 270, the sysDB iterates through each child tuple of the requested tuple to remove its "parent has sub-tree verification" flag. Once removed, configuration transaction requests made at any of the child tuples will not be verified with its parent tuple. Step 280 is then carried out.

At step 280, the unregistration is complete. The sysDB 26 will transmit an acknowledgment to the requesting subsystem to indicate that its verification unregistration was successful.

As described above, transactions made within the tuples of sysDB tree 42 that trigger verification include, for example, tuple create requests, tuple delete requests, tuple modification requests, and tuple reversion requests. Referring now to FIG. 6, as well as FIG. 1 through FIG. 5, there is shown generally the steps of verifying a change transaction request. A change event occurs when a subsystem issues a configuration data change with the sysDB 26. Configuration changes to a router device is common as is known in the art and may include, for example, changes to IP addresses, subnet masks, and other protocol parameters.

At step 290, a subsystem transmits a change tuple request to the sysDB 26. Step 300 is then carried out. The change request includes the proposed or "changed" value of the router configuration associated with the tuple.

At step 300, the sysDB 26 receives the change tuple request of step 290 and ascertains the location of the tuple in the sysDB tree 42. The sysDB 26 calls a tuple iterator function to find the location of the tuple for which a change is requested. The iterator function searches the sysDB tree 42 starting at the root (cfg) 43 to ascertain the location of the requested tuple. Step 310 is then carried out.

At step 310, the iterator function determines whether the requested tuple was found during the search of step 300. If the tuple is not found, step 320 is carried out. Otherwise, step 330 is carried out.

At step 320, the iterator function was not able to find the requested tuple in the sysDB tree 42. The absence of a tuple for change or update is interpreted as an error because a change of value at a tuple is proper only if the tuple was previously created. Since the iterator function did not find the requested tuple, the change request is improper and an error message is displayed to the user to indicate a change request error.

At step 330, the sysDB 26 determines whether the requested tuple found in step 310 has a subsystem registered for verification therein. If the tuple has a subsystem registered for verification, the registered subsystem must first authorize or validate the proposed change request of step 290 before the change is carried out. If the requested tuple has a subsystem registered for verification, step 340 is carried out. Otherwise step 350 is carried out.

At step 340, the sysDB 26 determines that the requested tuple found has a subsystem registered for verification. The sysDB 26 then calls the verification handler routine which either accepts the change request or rejects the change request. The verification handler routine is described in further detail in conjunction with FIG. 7 below. Step 360 is then carried out.

At step 360, the sysDB 26 receives a reply from the verification handler routine. The verification handler will return a "success" reply for authorized changes, or an "error" reply for unauthorized for rejected changes. As described further below in conjunction with FIG. 7, a "success" reply may comprise either an "accepted and update" message or an "accepted and do not update" message. An "error" reply is represented by a "rejected" message. If a "success" reply is issued, step 400 is carried out to set the tuple value. Otherwise step 370 is carried out to generate an error message.

At step 370, the verification handler returned an "error" in response to proposed changes issued at step 290. An error message is generated and is displayed to the user.

At step 350, the sysDB 26 determines whether the requested tuple has its "parent has sub-tree verification" flag set. If the "parent has sub-tree verification" flag is set, then a subsystem is registered at a parent level to verify changes to a name space which includes the requested tuple before such change is carried out. If the "parent has sub-tree verification" flag is set at the requested tuple, then step 380 is carried out. Otherwise, step 400 is carried out to set the tuple value.

At step 380, the sysDB 26 iterates the sysDB tree 42 to the parent of the currently inspected tuple, to thereby ascertain subsystems, if any, registered for verification at the parent tuple. It will be appreciated that when actually carrying out the verification sequence, described in step 340, the present invention verifies the value(s) provided in the change request of step 290 with such registered subsystems, if any. Step 390 is then carried out.

At step 390, the sysDB 26 determines whether the tuple iterated to in step 380 is the root (cfg) 43 of the sysDB tree 42. If the currently iterated tuple is the root (cfg) 43 of the sysDB tree 42, step 400 is carried out to set the tuple value. Otherwise step 330 is repeated again to confirm verification at the iterated parent level.

At step 400, the sysDB 26 sets the configuration value for the tuple. During the verification step of 340, two possible "success" responses may be provided by the verification handler routine. The first is an "accept and update" message which is provided when the changed value is accepted and is different from the original value of the tuple. In response to an "accepted and update" response, the sysDB 26 updates the sysDB tree with the change value. The second "success" response is an "accepted and do not update" message which is provided when the changed value is accepted, but is the same as the old or original value of the tuple. In response to an "accepted and do not update" reply from a registered subsystem, the sysDB does not update the sysDB tree. In either case, the tuple is considered set or activated with the changed value.

In the preferred embodiment, the previous or original value for the tuple is stored and may be reverted upon request. Copending application Ser. No. 09/416,310 entitled METHOD AND SYSTEM FOR EXECUTING, TRACKING AND RESTORING TEMPORARY ROUTER CONFIGURATION CHANGE USING A CENTRALIZED DATABASE, filed Oct. 12, 1999, describes in further detail the method for carrying out configuration changes and reversions with a centralized database and is expressly incorporated by reference herein. Step 410 is then carried out.

At step 410, the sysDB 26 executes the notification routine which notifies registered subsystems of changes made to the requested tuple. Copending application Ser. No. 09/416,308 entitled SUBSYSTEM APPLICATION NOTIFICATION METHOD IN A CENTRALIZED ROUTER DATABASE, filed Oct. 12, 1999, describes in further detail the method for carrying out router configuration change notifications in conjunction with a centralized database and is expressly incorporated by reference herein.

Referring now to FIG. 7 as well as FIG. 1 through FIG. 6, there is shown generally the steps involved in a verification handler sequence associated with a router configuration transaction request. As noted above, a router configuration transaction request may comprise, for example, a request to change, delete, or create configuration data maintained by the sysDB 26.

At step 420, the sysDB 26 transmits a verification message to the registered subsystem for verification. The verification message will include, among other things, the proposed configuration data associated with the router configuration transaction request. Step 430 is then carried out.

At step 430, the subsystem registered for verification receives the verification message of step 420. In response to this message, the registered subsystem checks the proposed configuration data using various algorithms known in the art. For example, the subsystem may verify the format of the proposed configuration data and/or the value of the configuration data to determine whether such proposed configuration data is appropriate. Step 440 is then carried out.

At step 440, based on the check performed in step 430, the registered subsystem determines whether the proposed transaction is valid. If the proposed transaction is valid, step 460 is carried out to accept the proposed transaction. Otherwise step 450 is carried out to reject the proposed transaction.

At step 450, the registered subsystem transmits "rejected" message to the sysDB 26 to indicate that the proposed transaction was not successful and that an error was produced during verification of the proposed transaction. The "rejected" message may indicate the error associated with the proposed transaction which may then be communicated to a user of the router device.

At step 460, the registered subsystem determines whether the configuration data provided by the proposed transaction is different from the original configuration data already in place. If the proposed configuration is the same as the original configuration data, update of the sysDB tree 42 is not required since the proposed configuration is already active, and step 470 is then carried out to communicate this message. If the proposed configuration is different from the original configuration data, update of the sysDB tree 42 is required to set or activate the proposed configuration data, and step 480 is carried out to communicate an update message.

At step 470, the registered subsystem transmits an "accepted and do not update" message to the sysDB 26 to indicate that the proposed transaction was successfully validated. As described above, an "accepted and do not update" message indicates that the proposed transaction request was validated or otherwise verified, but that update of the sysDB tree 42 is not to be carried out.

At step 480, the registered subsystem transmits an "accepted and do not update" message to the sysDB 26 to indicate that the proposed transaction was successfully validated. An "accepted and update" message indicates that the proposed transaction request was validated and that update of the sysDB tree 42 is to be carried out.

At the completion of step 450, step 470, or step 480, the verification handler sequence is completed and control is returned to the sysDB 26 to complete further verification process as described in step 360 in conjunction with FIG. 6 above.

Accordingly, it will be seen that this invention provides a method for verifying router configuration transactions using a centralized database. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for providing a configuration database in a router system that notifies a plurality of subsystems of verification of configuration data stored in said configuration database, said method comprising:

receiving a notification request from one of a plurality of subsystems in said configuration database wherein said notification request indicates one of said plurality of entries of configuration data for which said one of said plurality of subsystems requires notification of a verification of said one of said plurality of entries;

retrieving said one of said plurality of entries in said configuration database for said configuration data indicated in said notification request from said configuration database; and storing an indication of said one of said plurality of subsystems in a list of subsystems to be notified of a verification in said one of said plurality of entries of said configuration database responsive to receiving said request.

2. The method of claim 1 further comprising:

receiving a verification of said one of said plurality of entries in said configuration database;

reading said list of subsystems requesting notification from said one of said plurality of entries responsive to receiving said verification; and transmitting a notification of said verification from said configuration database to each of said plurality of subsystems read from said list responsive to receiving said reading of said list.

3. The method of claim 1 wherein said plurality of entries is maintained in a tree structure by said configuration database.

4. The method of claim 3 further comprising:

determining whether said notification request is for configuration data of a name space; and storing said indication of said one of said plurality of subsystems in a list of subsystems to be notified of verification in each child entry of said one of said plurality of entries that stores said configuration data.

5. The method of claim 1 further comprising:

receiving a subsequent request in said configuration database to unregister said one of said plurality of subsystems for notification of verification of said one of said entries of said configuration data identified in said subsequent request;

retrieving said one of said plurality of entries from said configuration database; and removing said one of said plurality of subsystems from said list of said one of said plurality of entries identified in said subsequent request.

6. A product for providing a configuration database in a router system that notifies a plurality of subsystems of verification of configuration data in stored in said configuration database, said product comprising:

instructions for directing a processing unit in said database to:

receive a notification request in said configuration database from one of a plurality of subsystems wherein said notification request indicates one of said plurality of entries of configuration data for which said one of said plurality of subsystems requires notification of a verification of said one of said plurality of entries;

retrieve said one of said plurality of entries indicated in said notification request from said configuration database;

store an indication of said one of said plurality of subsystems in a list of subsystem to be notified of a verification in said one of said plurality of entries in said configuration database responsive to receiving said notification request; and a media readable by said processing unit that stores said instructions.

7. The product of claim 6 wherein said instructions further comprise:

instructions for directing said processing unit to:

receive a verification of said one of said plurality of entries in said configuration database;

read said list of subsystems requesting notification for said one of said plurality of entries responsive to receiving said verification; and transmit a notification of said verification from said configuration database to each of said plurality of subsystems read from said list responsive to receiving said verification.

8. The product of claim 6 wherein said plurality of entries is maintained in a tree structure by said configuration database.

9. The product of claim 8 wherein said instruction further comprise:

instructions for directing said processing unit to:

determine whether said notification request is for configuration data of a name space; and store said indication of said one of said plurality of subsystems in a list of subsystems to receive notification of a verification in each child entry of said one of said plurality of entries in said configuration database that stores said configuration data.

10. The product of claim 6 wherein said instructions further comprise:

instructions for directing said processing unit to:

receive a subsequent request in said configuration database to unregister said one of said plurality of subsystems for notification of verification of said one of said entries of said configuration data identified in said subsequent request, retrieve said one of said plurality of entries identified in said subsequent request, and remove said one of said plurality of subsystems from said list of said one of said plurality of entries identified in said subsequent request.

* * * * *